(12) United States Patent
Peck et al.

(10) Patent No.: US 8,726,551 B2
(45) Date of Patent: May 20, 2014

(54) RETROREFLECTIVE FILM

(75) Inventors: John D. Peck, Arlington Heights, IL (US); Eduardo da Silva Matos, Vinhedo, SP (BR)

(73) Assignee: Avery Dennison Corporation, Glendale, CA (US)

( * ) Notice: Subject to any disclaimer, the term of this patent is extended or adjusted under 35 U.S.C. 154(b) by 970 days.

(21) Appl. No.: 11/722,102

(22) PCT Filed: Jan. 10, 2006

(86) PCT No.: PCT/US2006/000738
§ 371 (c)(1),
(2), (4) Date: Jun. 19, 2007

(87) PCT Pub. No.: WO2006/076320
PCT Pub. Date: Jul. 20, 2006

(65) Prior Publication Data
US 2008/0092418 A1    Apr. 24, 2008

(30) Foreign Application Priority Data

Jan. 10, 2005   (BR) ..................................... 0500848

(51) Int. Cl.
*G09F 13/16*    (2006.01)
(52) U.S. Cl.
USPC .......................................................... 40/582
(58) Field of Classification Search
USPC .................................................. 40/200, 208
See application file for complete search history.

(56) References Cited

U.S. PATENT DOCUMENTS

| 2,587,325 | A | * | 2/1952 | Husted | 40/208 |
| 3,973,342 | A | * | 8/1976 | Gubela | 40/582 |
| 4,983,436 | A | * | 1/1991 | Bailey et al. | 428/40.4 |
| 5,227,194 | A | * | 7/1993 | De La Sierra E. | 427/162 |
| 5,812,316 | A | * | 9/1998 | Ochi et al. | 359/530 |
| 6,083,607 | A | * | 7/2000 | Mimura et al. | 428/167 |
| 6,470,610 | B1 | * | 10/2002 | Northey | 40/582 |
| 6,531,212 | B2 | * | 3/2003 | Owusu et al. | 428/323 |

FOREIGN PATENT DOCUMENTS

| DE | 20316349 | 12/2003 |
| JP | 2002090516 | 3/2002 |
| MU | 85004448 | 10/2006 |
| WO | 9526281 | 10/1995 |

OTHER PUBLICATIONS

PCT/US2006/000738; PCT International Search Report mailed Jun. 28, 2006.
Translation of MU 85004448.

* cited by examiner

*Primary Examiner* — Charles A Fox
*Assistant Examiner* — Shin Kim
(74) *Attorney, Agent, or Firm* — Avery Dennison Corporation

(57) ABSTRACT

A retroreflective film (30) comprising a cover layer (40), a prismatic layer (42), a reflective layer (44), an adhesive layer (46), and a protective liner (48). The prismatic layer (42) has retroreflective prism elements (60) formed on its rear surface and the reflective layer (44) covers the rear surfaces of the prism elements. The film (30) has an elongation of at least 20% and can be constructed for use with a substrate subjected to a cold-work deformation process, such as stamping, embossing, or pressing.

20 Claims, 3 Drawing Sheets

RETROREFLECTIVE FILM

This application is a national phase of International Application No. PCT/US2006/000738 filed Jan. 10, 2006 and published in the English language, and claims priority to BR PI0500848-4 filed Jan. 10, 2005.

FIELD OF THE INVENTION

This invention relates generally to a retroreflective film and, more particularly, to a retroreflective film that can be used in an article (e.g., a license plate) having a substrate with an embossed, stamped, pressed, or otherwise irregular surface profile.

BACKGROUND OF THE INVENTION

A retroreflective film can be used in many articles, such as license plates, highway signs, safety signs, and other retroreflecting items. In many of these applications, it is important that the film be not only reflective, but capable of accommodating a stamped, embossed, pressed or otherwise irregular substrate surface. For example, a license plate typically comprises a relatively flat substrate (e.g., an aluminum plate) that is stamped, embossed, pressed, or otherwise cold-work deformed to provide raised areas corresponding to alphanumerical characters and/or other indicia. When a retroreflective film is used in a license plate, it is laminated to the substrate when it is still flat (e.g., prior to stamping, embossing or pressing) whereby the retroreflective film must be able to accommodate the cold-work deforming step.

SUMMARY OF THE INVENTION

The present invention provides a retroreflective film that can accommodate a cold-work deformation step (e.g., a stamping, embossing, or pressing step) when adhered to a substrate. As such, the film can be incorporated into a retroreflective article (e.g. a license plate) wherein a substrate is cold-worked to form raised areas corresponding to alphanumeric characters and/or other indica. The retroreflective film incorporates a prismatic layer thereby allowing a wider range of design flexibility when devising a particular retroreflective product and/or thereby providing high retroreflective capabilities.

The present invention also provides a retroreflective article (e.g., a license plate) wherein the substrate has a visible light transmission of less than 30% and/or wherein a layer of the retroreflective film has a visible light transmission of less than 30%. For example, the substrate can comprise an aluminum plate which is essentially opaque. Additionally or alternatively, the film can include a reflective layer (e.g., a metallized layer) in back of its prismatic layer which has a low visible light transmission. In either case, the loss of light through the rear of the article is prevented thereby helping to maximize retroreflectivity.

These and other features of the invention are fully described and particularly pointed out in the claims. The following description and drawings set forth in detail a certain illustrative embodiment of the invention which is indicative of but one of the various ways in which the principles of the invention may be employed.

DRAWINGS

DETAILED DESCRIPTION

Figure 1:
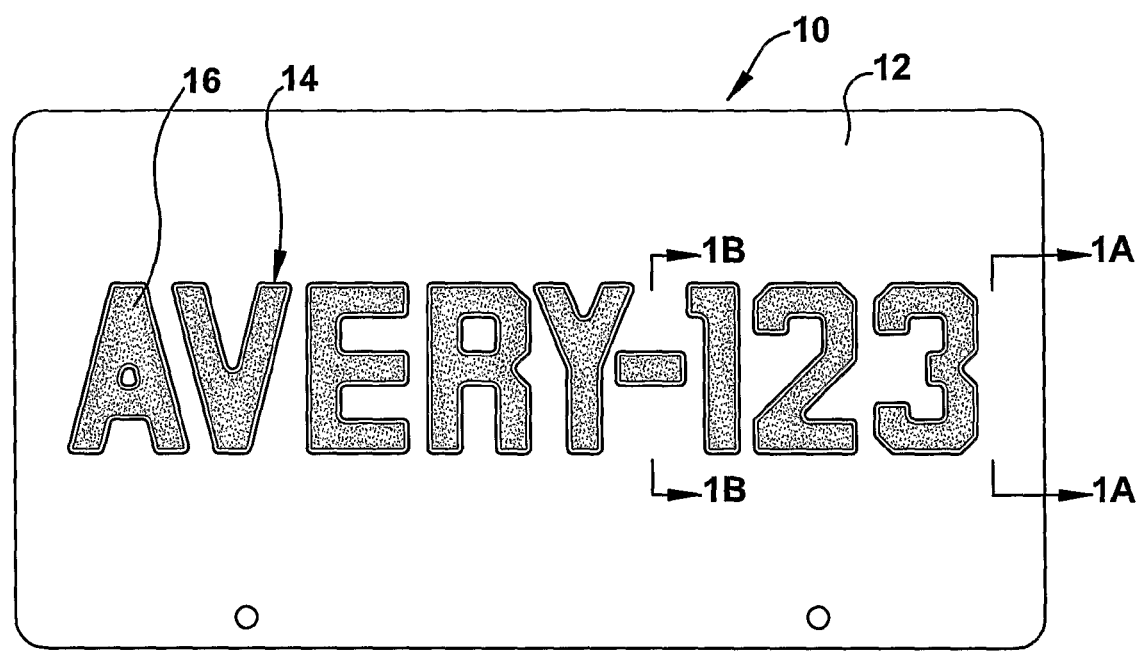
FIG. 1 is a front view of a retroreflective article (e.g., a license plate) according to the present invention.

Referring now to the drawings, and initially to FIG. 1, a retroreflective article 10 according to the present invention is shown. The illustrated article is a license plate 10 that can be mounted to, for example, a motor vehicle such as a car. The license plate 10 comprises a flat area 12 forming a background and raised areas 14 forming alphanumeric characters and/or other indicia.

The front surface (i.e., the surface facing the observer) of the flat background-forming area 12 is retroreflective to enhance the visibility of the license plate 10. Paint 16 (and/or another covering) can be applied to the raised indicia-forming areas 14 to render them non-reflective. The background and the indicia (e.g., the paint 16) can be the same color, but in most cases will be different colors to increase the noticeability of the indicia.

Figure 1A:
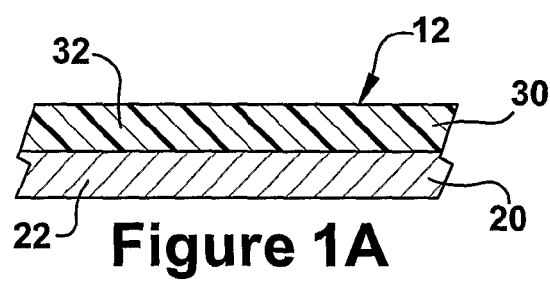
FIG. 1A is a sectional view of the retroreflective article as seen along line 1A-1A in FIG. 1, this view showing its flat background-forming area.
Figure 1B:
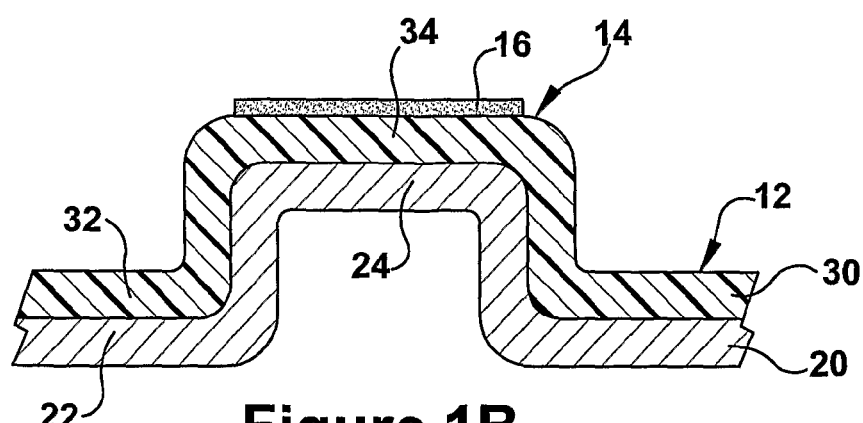
FIG. 1B is a sectional view of the retroreflective article as seen along line 1B-1B in FIG. 1, this view showing one of its raised indicia-forming areas.

As is best seen by referring additionally to FIGS. 1A and 1B, the article 10 comprises a substrate 20 and a retroreflective film 30 laminated or otherwise adhered to the front surface of the substrate 20. The substrate 20 has a flat area 22 corresponding to the flat area 12 of the license plate 10, and raised areas 24 corresponding to the raised areas 14 of the license plate 10. The retroreflective film 30 has a flat area 32 corresponding to the flat area 12 of the license plate 10, and raised areas 34 corresponding to the raised areas 14 of the license plate 10. The raised areas 24/34 will typically have a height in the range of about 0.3 mm to about 3 mm relative to the flat areas 22/32.

The raised areas 24 and 34 can be simultaneously formed to thereby form the indicia-forming areas 14 in the license plate 10. For example, the substrate 20 (without raised areas 24) and the retroreflective film 30 (without raised areas 34) can be complied so that the front surface of the substrate 20 is adhered to the rear surface of the retroreflective film 30. The substrate/film compilation 20/30 can then be stamped, embossed, pressed or otherwise cold-work deformed to produce the raised areas 24/34.

The substrate 20 should be made of a material, and should have a thickness and/or tensile strength, to accommodate the desired deformation (i.e., indicia-forming) method. For example, the substrate 20 can be made of a metal or a plastic, with a soft metal (e.g., aluminum, copper, silver, gold) with good drawing properties often being preferable. The substrate 20 can have a thickness in the range of 0.05 mm to 5 mm if it is metal. The substrate 20 can be made of an essentially opaque material, that is neither transparent nor translucent, and/or a material that has a visible light transmission of less than 30%, less than 25%, less than 20%, and/or less than 10%.

In the illustrated embodiment, the substrate 20 can be a thin (e.g., 2 mm or less) aluminum plate which is essentially completely opaque.

According to the present invention, the retroreflective film 30 is constructed to accommodate the forming of its raised areas 34 (e.g., the indicia-forming areas). Specifically, the film 30 should be capable of withstanding the desired deformation method (i.e., stamping, embossing, pressing). To this end, the retroreflective film 30 has an elongation of at least 20%, preferably at least 40%, and more preferably at least 50%, at least 60%, and/or at least 70%. In fact, the retroreflective film 30 of the present invention can be designed to have an elongation in excess of 100%. Elongation refers to the extent that the film can be stretched in one or more dimensions without breaking and its "elongation" is the point of this breakage.

Figure 2:
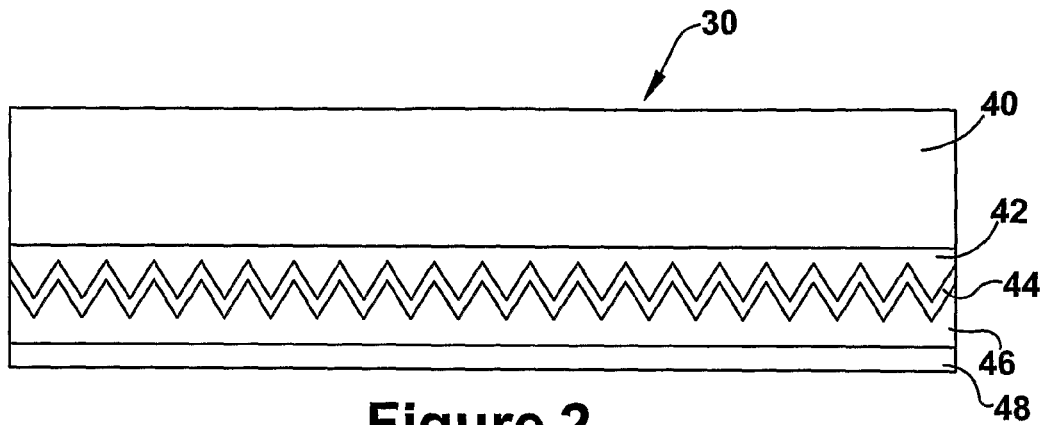
FIG. 2 is a close-up sectional view of a retroreflective film according to the present invention.

The construction of the retroreflective film 30 is shown in more detail in FIG. 2. The illustrated film 30 comprises (from top to bottom in the illustrated orientation) a cover layer 40, a prismatic layer 42, a reflective layer 44, an adhesive layer 46, and a release liner 48. The cover layer 40 is the frontmost layer (i.e., closest to the observer) in the illustrated embodiment and, in any event, is positioned in front of the prismatic layer 42. Thus, the cover layer 40 should be transparent and/or translucent to allow light to reach the prismatic layer 42, and is preferably highly transparent.

The cover layer 40 is constructed to protect the integrity of the other layers (and particularly the prismatic layer 42) against weather, abrasion, peeling, high temperature, and/or rain acidity. In the illustrated embodiment, the paint 16 is applied to the cover layer 40 whereby this compatibility should be taken into consideration when selecting the cover layer 40 and/or the paint 16. The cover layer 40 can made from a thermoplastic resin and/or a thermoplastic polymer, such as vinyl or polyurethane. If the cover layer 40 is, for example, calendar vinyl, it can have a thickness of greater than 150 µm (about 6 mil), greater than 180 µm (about 7 mil), greater than 200 µm (about 8 mil), greater than 230 µm (about 9 mil), greater than 250 µm (about 10 mil), or at least 300 µm (about 12 mil). If the cover layer 40 is, for example, cast vinyl, it can have a thickness as low as 30 µm (about 1.2 mil). A cover coating (not shown) can be placed over the cover layer 40 for protection or other purposes. The cover layer 40 can incorporate a color pigment to result in a transparent color (e.g., yellow, red, blue, green, brown, orange, etc.).

Figure 3:
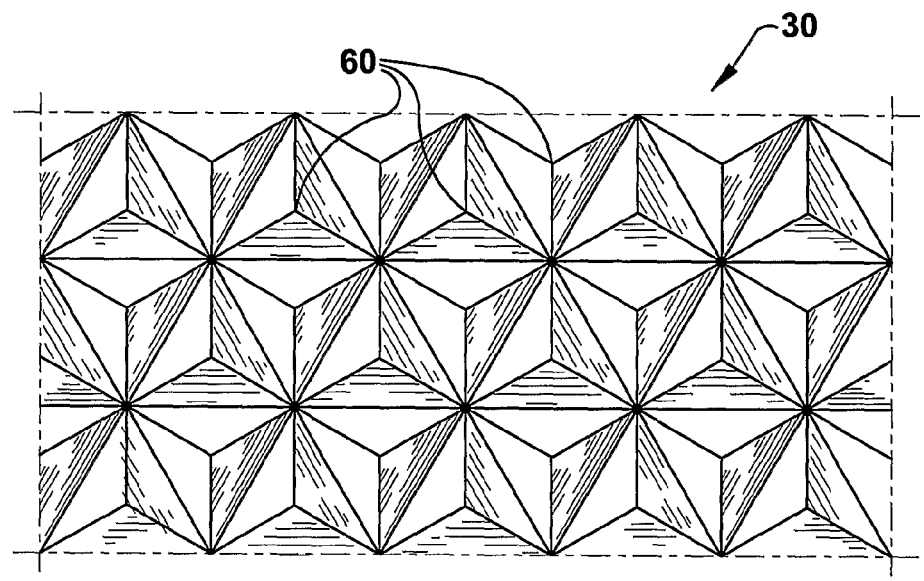
FIG. 3 is a rear view of the prismatic layer of the retroreflective film.

The prismatic layer 42 has a plurality of retroreflective elements 60 embossed, casted, molded, or otherwise formed thereon. As is best seen by referring briefly to FIG. 3, the retroreflective elements 60 can comprise an array of cube corner elements (i.e., prism structures) which each have three mutually perpendicular faces meeting at a single corner or apex. The total cube area of each retroreflective element 60 can be about 1 mm$^2$ or less and, if so, the elements 60 can be considered micro-optical elements and/or microcubes. The present invention contemplates the use of microcubes and/or larger cube corner elements.

The prismatic layer 42 can incorporate a color pigment resulting in a transparent color. This incorporation can be in addition to, or as an alternative to, the cover layer 40 including a color pigment. If both the layer 40 and the layer 42 incorporate a color pigment, it will usually be the same color, however, the use of two different pigments is certainly possible.

Typically, the prismatic layer 42 is formed from a sheet material having first and second flat surfaces. The retroreflective elements 60 are formed by embossing, casting, or molding in the first surface of the sheet material and the elements 60 extend into the sheet material a certain depth. Thus, the prismatic layer 42 is made of a material which is compatible with the element-forming method (e.g., embossing, casting, molding) and which is transparent/translucent (and preferably highly transparent). Suitable materials include, for example, acrylic or polycarbonate. A is best seen by referring briefly to FIG. 4, the portion of the material between the elements 60 and the upper surface 62 of the layer 42 forms a base or body sublayer 64. The prismatic layer 42 can be viewed as having a thickness $t_{layer}$ extending from its upper surface 62 to the lower peaks of its retroreflective elements 60. The retroreflective elements 60 can be viewed as having a height $h_{elements}$ measured from their lower peaks to the bottom surface of the sublayer 64. The sublayer 64 can be viewed as having a thickness $t_{sublayer}$ measured from its bottom surface to the upper surface 62.

The sublayer 64 of the prismatic layer 42 can have a thickness $t_{sublayer}$ of less than 55 µm (about 2.17 mils), less than 50 µm (about 1.97 mils), less than 45 µm (about 1.77 mils), less than 40 µm (about 1.57 mils), less than 35 µm (about 1.37 mils), less than 30 µm (about 1.18 mils), and/or less than 25 µm (about 0.97 mils). The retroreflective elements 60 can have a height $h_{elements}$ of greater than 35 µm (about 1.4 mils), greater than 75 µm (about 3 mils), greater than 100 µm (about 4 mils), greater than 150 µm (about 6 mils), greater than 200 µm (about 8 mils), and/or greater than 250 µm (about 10 mils). If the retroreflective elements 60 have a height $h_{elements}$ of less than 115 µm (about 4.5 mils), the best elongation features may be obtained by the thickness $t_{sublayer}$ being between 50 µm (about 2 mils) and 25 µm (about 1 mil). If the retroreflective elements 60 have a height $h_{elements}$ of greater than 115 µm (about 4.5 mils), the best elongation features may be obtained by the thickness $t_{sublayer}$ being less than 25 µm (about 1 mil).

Figure 4:
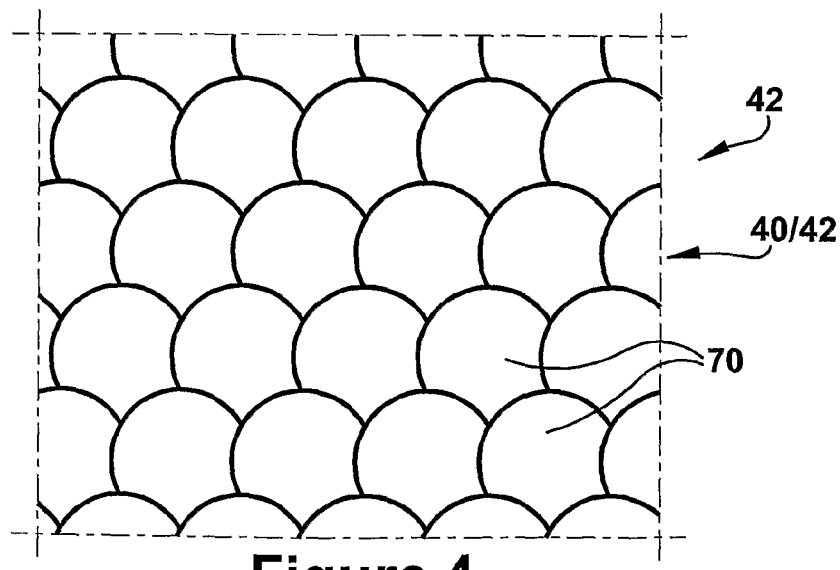
FIG. 4 is a rear view of the cover layer and/or a front view of the prismatic layer of the retroreflective film.
Figure 5:
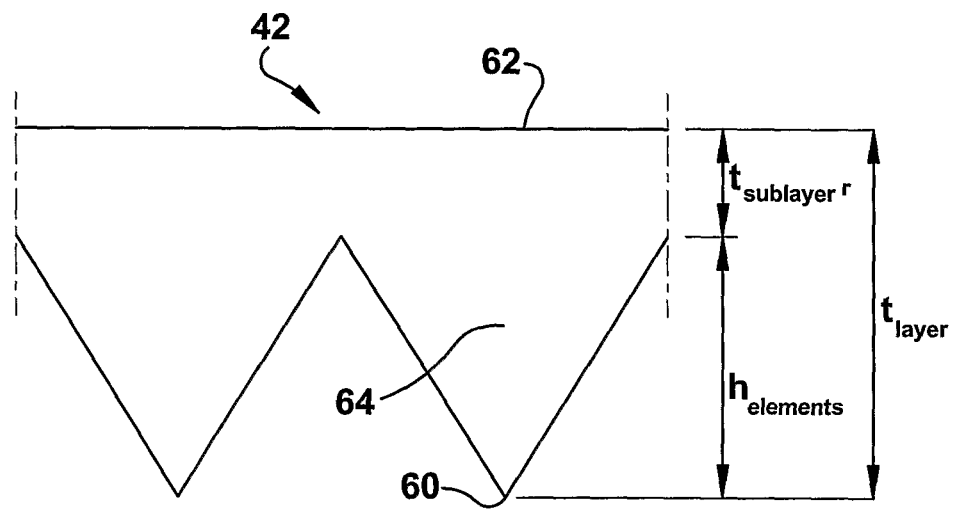
FIG. 5 is a side enlarged view of the prismatic layer.

As is best seen by referring briefly to FIG. 4, the bottom surface of the cover layer 40 and/or the top surface of the prismatic layer 42 can optionally be preprinted with a non-transparent (i.e., translucent or opaque) pattern 70, such as the illustrated shell pattern. In the illustrated pattern, each shell would be roughly 3 mm to 4 mm in diameter (if approximated to a circular shape). The purpose of this pattern 70 is to increase daytime brightness without a significant compromise in visible light transmission.

The reflective layer 44 can comprise a layer of reflective metal (e.g., silver, aluminum, gold, copper) vapor-deposited or otherwise applied over the exposed surfaces of the cube corner elements 60. The layer 44 can alternatively comprise a binder layer in which flakes of reflective metal are embedded. If the metal has a grayish color, and the cover layer 40 and the prismatic layer 42 are clear (e.g., white), the film 30 will sometimes be referred to as "gray."

The thickness of the reflective layer 44 will usually be significantly smaller than the prismatic layer 42 (although is it somewhat exaggerated in the drawing for the purposes of illustration). For example, the layer 44 can have a thickness in the range of 0.02 µm (about 0.0008 mils) to 0.125 µm (about 0.005 mils). The reflective layer 44 can be essentially opaque (i.e., neither transparent nor translucent) and/or it can have a visible light transmission of less than 30%, less than 25%, less than 20%, and/or less than 10%.

The adhesive layer 46 can comprise an acrylic-based adhesive or an emulsion-based adhesive. The adhesive can be heat-activated, solvent-activated, or pressure-sensitive (which is often preferred). The adhesive can be permanent (i.e., attached medium cannot be removed without noticeable damage) and/or removable (but will usually be permanent in a license plate situation). In any event, the layer 46 serves the functional purpose of adhering the film 30 to the substrate 20.

However, other substrate-adhering techniques are possible with, and contemplated by, the present invention. For example, the substrate 20 could include an adhesive layer on its front surface for film-adhering purposes, or an adhesive could be applied at the location whereat the substrate-film adhering step is performed. Moreover, non-adhesive techniques, such as heat bonding or mechanical attaching, could be used to adhere the film 30 to the substrate 20. In these instances, the film 30 would not have to include the adhesive layer 46 (although another space-filling medium may sometimes be necessary).

The release liner 48 can comprise a carrier web (e.g., paper or polyester) coated with a release agent (e.g., polyethylene or silicone). The function of the release liner 48 is to cover the adhesive layer 46 until the substrate-film adhering step is performed during the assembly of the article 10 and/or to act as a carrier layer during formation of the adhesive layer 46. In either event, if the film 30 does not include an adhesive layer 46, it probably need not include the release liner 48. Additionally, if the adhesive layer 46 is such that pre-assembly protection and/or a carrying medium is not necessary, the release liner 48 could be omitted from the film's construction. In any event, if film 30 does include the release liner 48, it will typically be removed prior to the film's incorporation into the retroreflective article 10.

Figure 6:
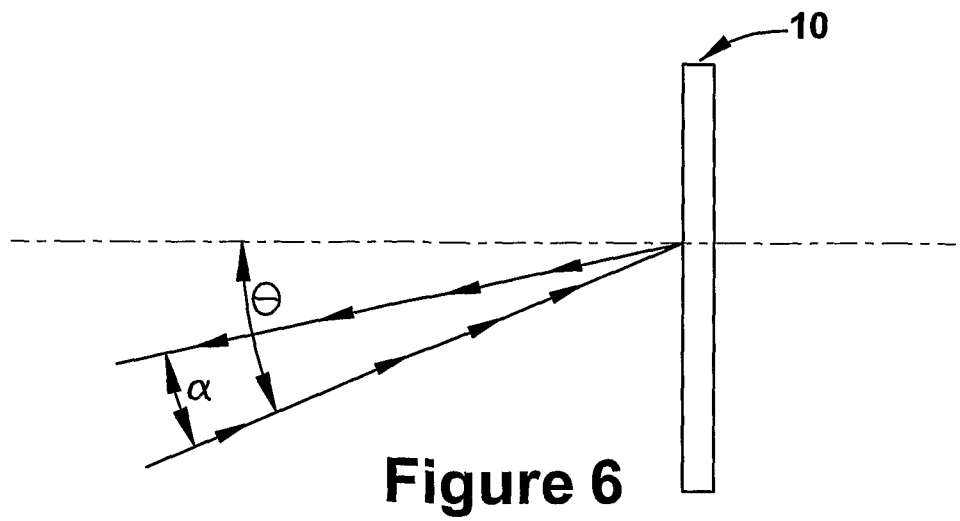
FIG. 6 is a schematic illustration of a light ray entering and leaving the license plate.

The retroreflective article 10 and/or the retroreflective film 30 according to the present invention can achieve high retroreflectivity (measured in, for example, in units of candela per lux-meters squared –cd/lux-m$^2$) when compared to films having a micro-lens (and/or beaded) layer instead of a prismatic layer. Specifically, for example, at an observation angle of 0.1° and an entrance angle of –4°, retroreflectivity in the range of 250 cd/lux-m$^2$ can be obtained; at an observation and at an entrance angle of 30° retroreflectivity in the range of 180 cd/lux-m$^2$ can be obtained. At an observation angle of 0.2°, and entrance angles at –4° and 30°, retroreflectivity in the range of 200 cd/lux-m$^2$ and 150 cd/lux-m$^2$, respectively can be obtained. At an observation angle of 0.5°, and entrance angles at –4° and 30°, retroreflectivity in the range of 95 cd/lux-m$^2$ and 65 cd/lux-m$^2$, respectively can be obtained. As is shown schematically in FIG. 6, the entrance angle θ is the angle between the entering light direction and a line perpendicular (horizontal in the illustrated embodiment) to the reflecting plane of the article 10. The observation angle α is the angle between the entering light direction and the leaving light direction (this angle is exaggerated somewhat in FIG. 6 as such a small angle would be difficult to draw).

One may now appreciate that the present invention provides a retroreflective film 30 that can accommodate a cold-work deformation step when adhered to a substrate 20. As such, the film 30 is especially amendable to license plate production. That being said, the retroreflective film 30 of the present invention can be used with other sized/shaped substrates to make, for example, signs (e.g., traffic, warning, regulation, address, service, general identification), safety devices (e.g., conex, lane dividers, lane markers, channel funnels) and other items. In fact, the retroreflective film 30 may also find application in substrate-less situations, especially if the relevant surface (e.g., the road, the wall, the track, the vehicle part, etc) has an irregular profile.

Although the invention has been shown and described with respect to a certain preferred embodiment, it is obvious that equivalent and obvious alterations and modifications will occur to others skilled in the art upon the reading and understanding of this specification. The present invention includes all such alterations and modifications and is limited only by the scope of the following claims.

The invention claimed is:

1. A retroreflective article having flat areas and raised areas, the article comprising a substrate and a retroreflective film having a rear surface adhered to a front surface of the substrate; wherein:
   the substrate has a flat area corresponding to the flat area and raised areas corresponding to the raised areas;
   the retroreflective film has a flat area corresponding to the flat area to enhance the visibility of the retroreflective article, and raised areas corresponding to the raised areas; the raised areas have a height in the range of about 0.3 mm to about 3 mm relative to the flat areas,
   the retroreflective film comprises a prismatic layer having retroreflective prism elements formed on its rear surface;
   the retroreflective film comprises a reflective layer positioned adjacent the rear surface of the prismatic layer and a cover layer, the cover layer is the frontmost layer positioned in front of the prismatic layer to protect the reflective layer and the prismatic layer;
   the retroreflective film has an elongation of at least 20%; and
   the substrate has a visible light transmission of less than 30% and/or wherein a layer of the film positioned rear of the prismatic layer has a visible light transmission of less than 30%.

2. A retroreflective article as set forth in claim 1, wherein the retroreflective film has an elongation of at least 50%.

3. A retroreflective article as set forth in claim 1, wherein the flat area forms a background and the raised areas form indicia.

4. A retroreflective article as set forth in claim 3, wherein the indicia comprises alphanumeric characters.

5. A retroreflective article as set forth in claim 1, wherein the substrate is made of metal.

6. A retroreflective article as set forth in claim 1, wherein the substrate has a thickness in the range of 0.05 mm to 5 mm.

7. A retroreflective article as set forth in claim 1, wherein the substrate is made of an essentially opaque material.

8. A retroreflective article as set forth in claim 1, wherein the substrate is an essentially opaque aluminum plate.

9. A retroreflective article as set forth in claim 1, wherein the retroreflective film has a non-transparent pattern pre-printed on a surface of the prismatic layer to increase daytime brightness.

10. A retroreflective article as set forth in claim 1, wherein the pattern is printed on the front surface of the prismatic layer.

11. A retroreflective article as set forth in claim 2, wherein the retroreflective film has a non-transparent pattern pre-printed on a surface of the cover layer to increase daytime brightness.

12. A retroreflective article as set forth in the claim 10, wherein the pattern is preprinted on the rear surface of the cover layer.

13. A method of making the retroreflective article as set forth in claim 1, comprising the step of simultaneously forming the raised areas in the substrate and the raised areas in the retroreflective film to thereby form the raised areas in the article and wherein the retroreflective film is composed of a material compatible with the forming, the retroreflective film having a background portion that enhances visibility of the retroreflective article.

14. A method as set forth in claim 13, wherein the simultaneously forming step comprises:
   compiling the substrate, prior to formation of its raised areas, and the retroreflective film, prior to formation of its raised areas, so that the front surface of the substrate is adhered to the rear surface of the retroreflective film; and cold-work deforming the substrate/film compilation to form the raised areas.

15. A method as set forth in claim 14, wherein said cold-work deforming step comprises stamping, embossing, or pressing.

16. A license plate comprising the retroreflective article set forth in claim 1.

17. A retroreflective article having flat areas and raised areas, the article comprising;

a substrate and a retroreflective film having a rear surface adhered to a front surface of the substrate; wherein:

the substrate has a flat area corresponding to the flat area and raised areas corresponding to the raised areas;

the retroreflective film has a flat area corresponding to the flat area and raised areas corresponding to the raised areas; the raised areas have a height in the range of about 0.3 mm to about 3 mm relative to the flat areas, the retroreflective film comprises a prismatic layer having retroreflective prism elements formed on its rear surface;

the retroreflective film comprises a reflective layer positioned adjacent the rear surface of the prismatic layer and a cover layer, the cover layer is the front most layer positioned in front of the prismatic layer to protect the reflective layer and the prismatic layer;

the retroreflective film has an elongation of at least 20%;

the substrate has a visible light transmission of less than 30% and/or wherein a layer of the film positioned rear of the prismatic layer has a visible light transmission of less than 30%;

wherein the flat area forms a background to enhance the visibility of the retroreflective article and the raised areas form indicia; and wherein paint is applied to the raised areas.

18. A retroreflective article as set forth in claim 17, wherein the paint renders the raised areas non-reflective.

19. A retroreflective article as set forth in claim 17 wherein the article is a license plate.

20. The license plate set forth in claim 19, wherein paint renders the raised areas non-reflective.

* * * * *